March 1, 1966 L. J. GROSSWILLER, JR., ETAL 3,237,882
PNEUMATIC SYSTEM TERMINAL APPARATUS
Filed Feb. 21, 1964 9 Sheets-Sheet 3
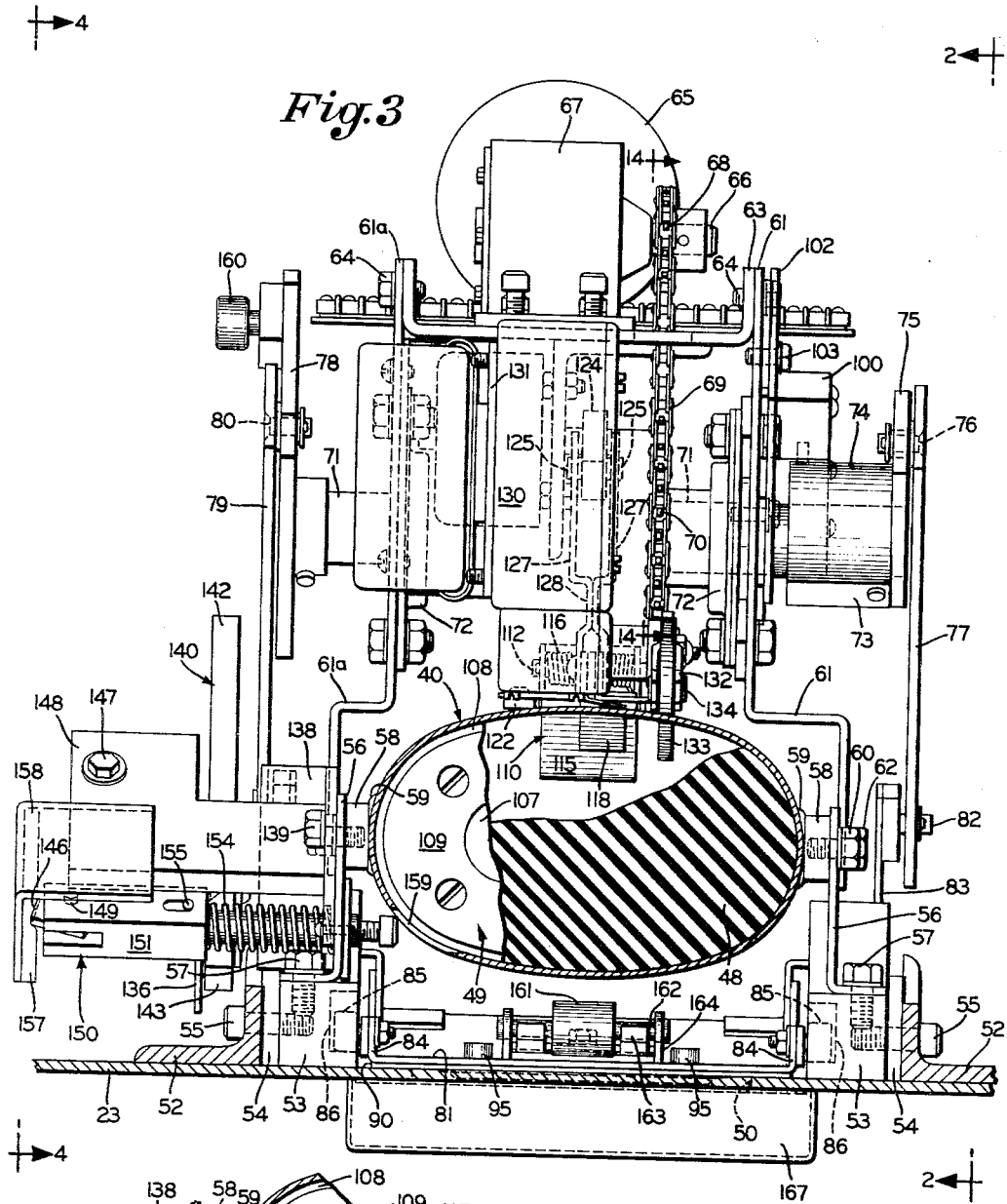
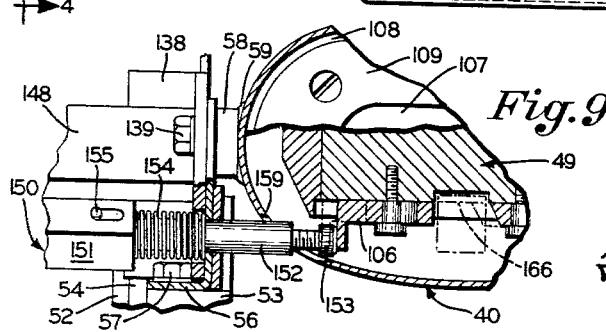
INVENTORS
Leo J. Grosswiller, Jr. and
BY Herbert C. Obermiller
Frease, Bishop, Johns & Schick
ATTORNEYS March 1, 1966    L. J. GROSSWILLER, JR., ETAL    3,237,882
PNEUMATIC SYSTEM TERMINAL APPARATUS Filed Feb. 21, 1964            9 Sheets-Sheet 4

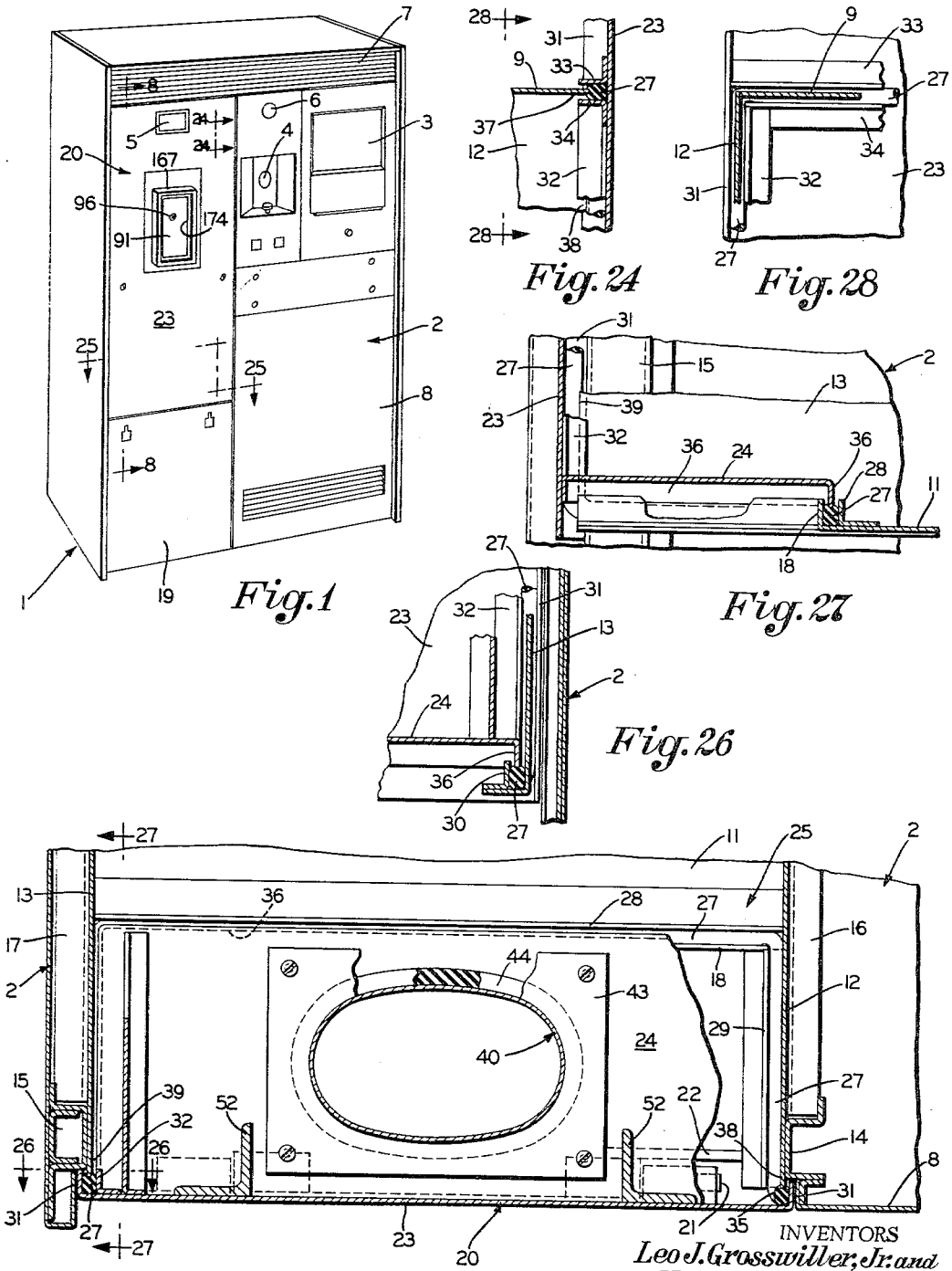

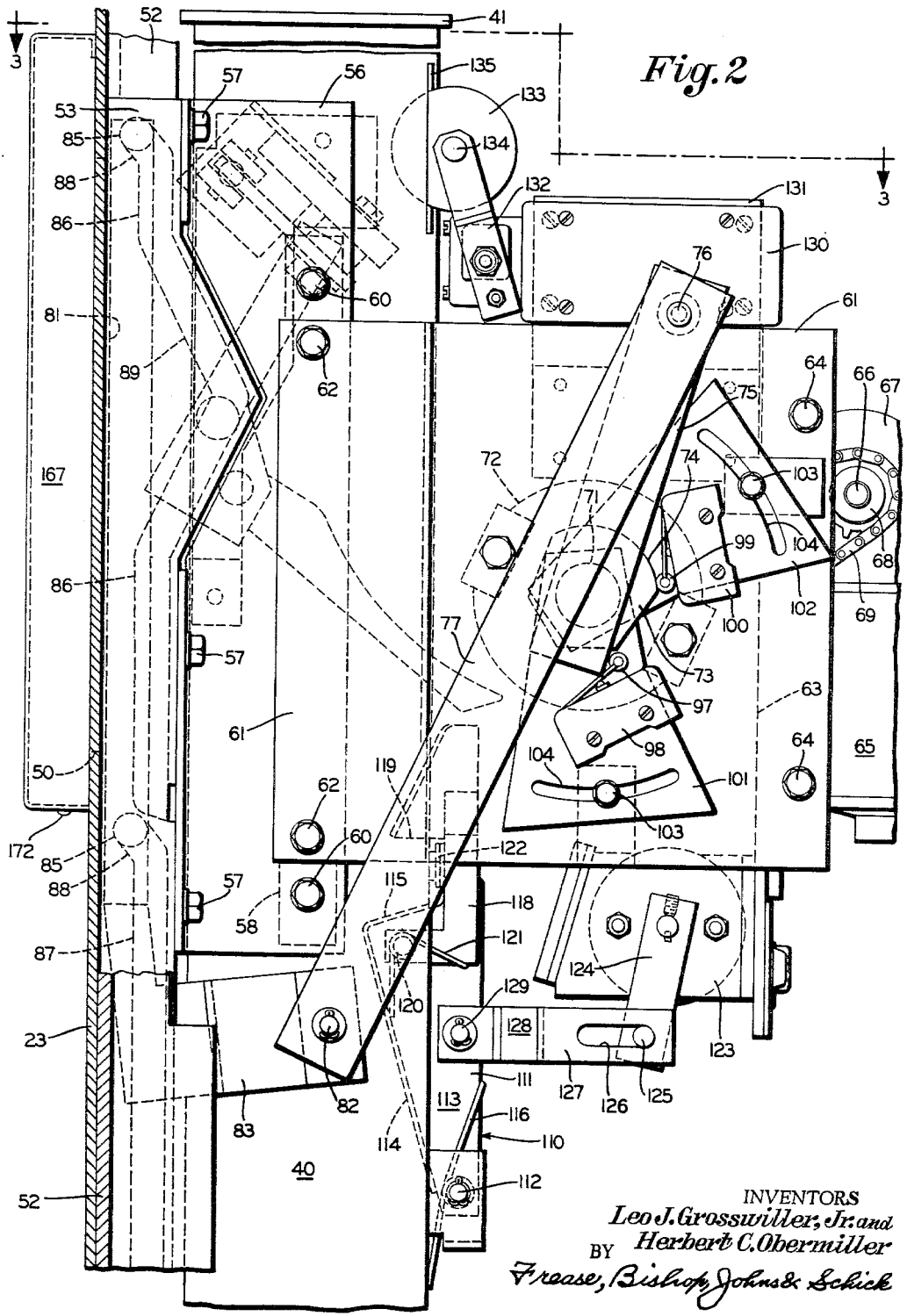

INVENTORS
Leo J. Grosswiller, Jr. and
BY Herbert C. Obermiller
Frease, Bishop, Johns & Schick
ATTORNEYS March 1, 1966   L. J. GROSSWILLER, JR., ETAL   3,237,882
PNEUMATIC SYSTEM TERMINAL APPARATUS
Filed Feb. 21, 1964   9 Sheets-Sheet 6

INVENTORS
Leo J. Grosswiller, Jr. and
BY Herbert C. Obermiller
Frease, Bishop, Johns & Schick
ATTORNEYS

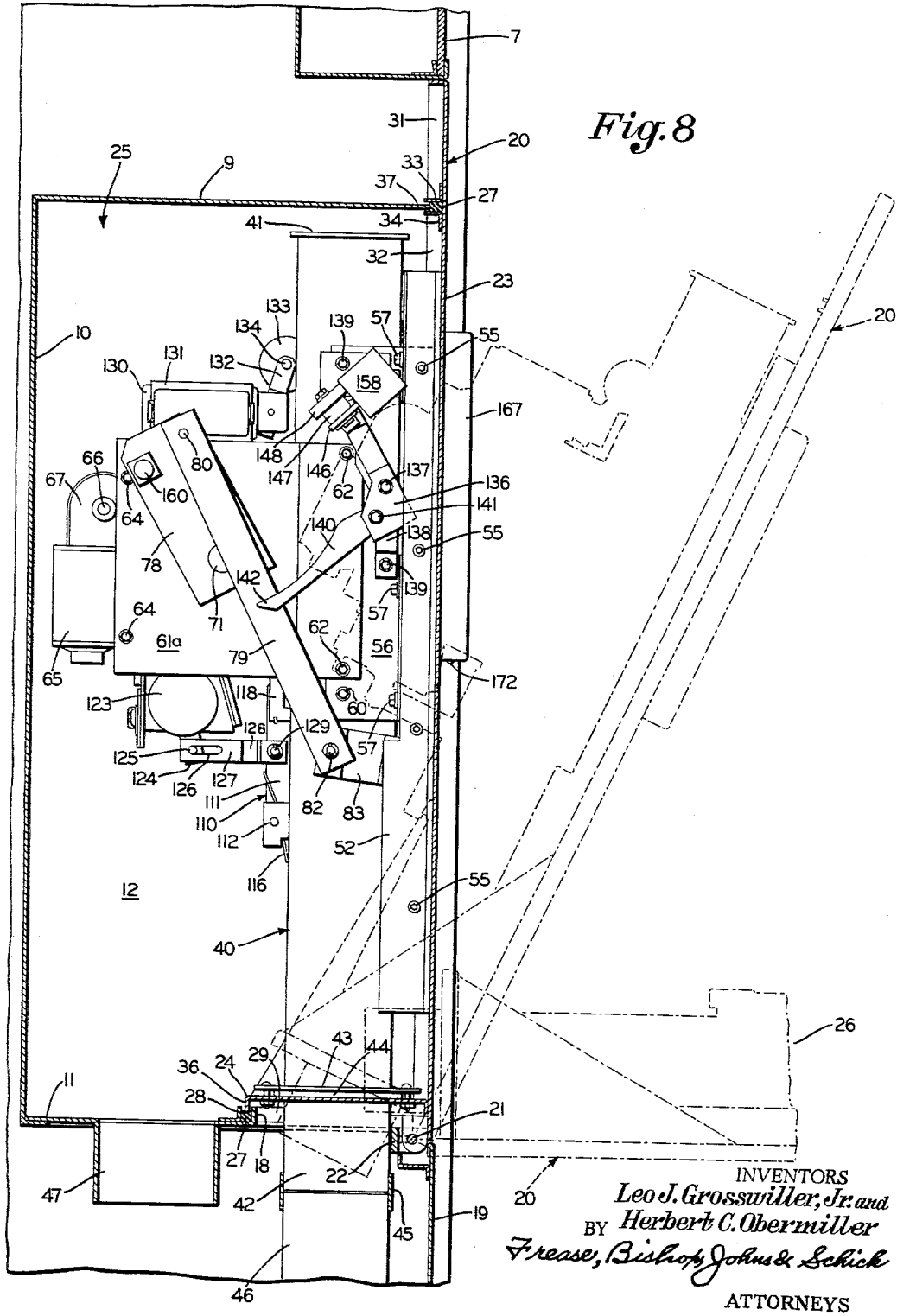

March 1, 1966 L. J. GROSSWILLER, JR., ETAL 3,237,882
PNEUMATIC SYSTEM TERMINAL APPARATUS
Filed Feb. 21, 1964
9 Sheets-Sheet 8
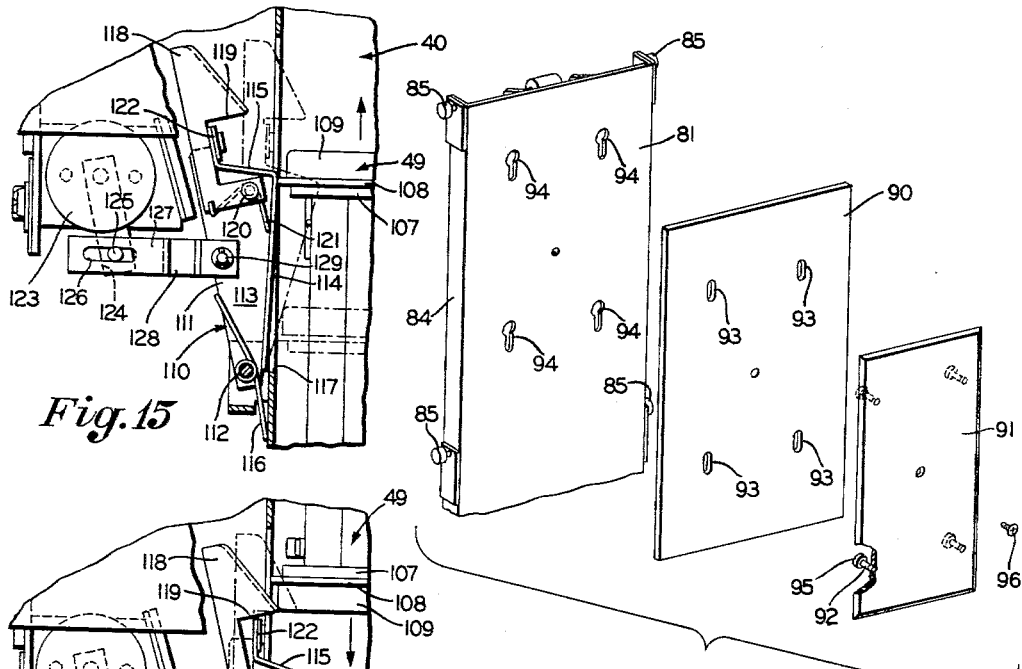
Fig.23
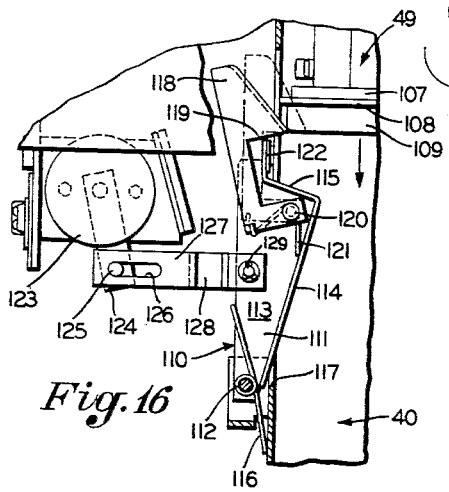
Fig.15
Fig.16
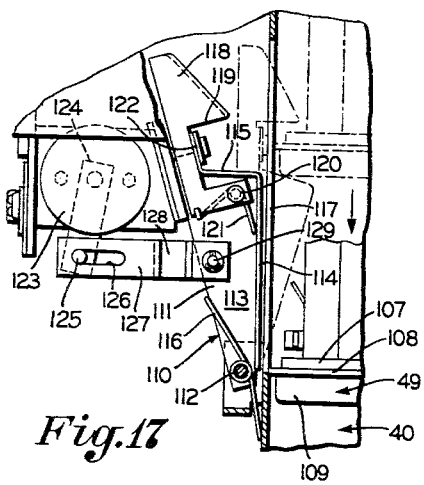
Fig.17
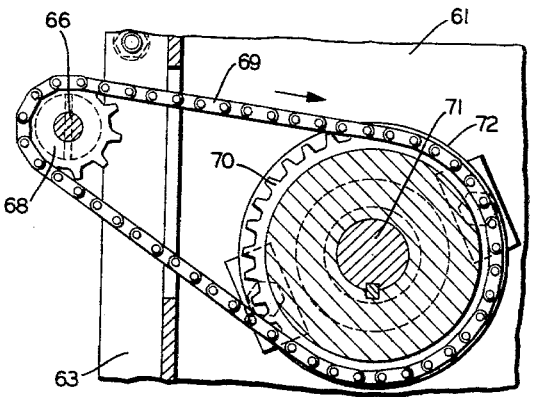
Fig.14
INVENTORS
Leo J. Grosswiller, Jr. and
BY Herbert C. Obermiller
Frease, Bishop, Johns & Schick
ATTORNEYS INVENTORS
Leo J. Grosswiller, Jr. and
BY Herbert C. Obermiller
Frease, Bishop, Johns & Schick
ATTORNEYS

United States Patent Office 3,237,882
Patented Mar. 1, 1966

3,237,882
PNEUMATIC SYSTEM TERMINAL APPARATUS
Leo J. Grosswiller, Jr., East Canton, and Herbert C. Obermiller, Canton, Ohio, assignors to Diebold, Incorporated, Canton, Ohio, a corporation of Ohio
Filed Feb. 21, 1964, Ser. No. 346,533
13 Claims. (Cl. 243—19)

The invention relates to pneumatic systems in which a carrier is moved rapidly by air pressure or vacuum through a conveyor tube between one station or terminal at one end and another station or terminal at the other end of the conveyer tube; and more particularly the invention relates to the construction and arrangement of the terminal apparatus for such pneumtaic tube systems by which carrier movement may be stopped effectively without equipment damage, by which the carrier may be located and latched in a predetermined position within a terminal compartment, by which access to such located carrier may be gained through door means provided for the carrier and an access opening in a barrier wall of the terminal compartment, by which the terminal apparatus mechanisms may be moved bodily out of the terminal compartment for adjustment or repair, by which effective seals may be provided for the walls and access opening of the terminal compartment to enable proper pneumatic operation, and by which safety devices may be provided for the door means, all with simplified construction of the terminal apparatus components and enhanced reliability and serviceability of the terminal apparatus and its components.

Pneumatic tube carrier systems have been used advantageously for conducting banking services because of the rapidity with which banking transaction media (such as deposit and withdrawal components which may include coin, paper money, checks, deposit slips and other similar articles) may be moved from a teller's console or station within a bank building at one end or terminal of the pneumatic tube to a customer's station or kiosk at the other end or terminal of the pneumatic tube remote from the teller's console and accessibly located for walk-up or drive-up banking transactions; and in which two-way oral and visual communication is established and maintained between the teller's console and the kiosk.

Equipment for conducting such banking services has included television cameras and receivers for establishing the two-way visual communication at the teller's console and kiosk, which is known as television banking equipment.

There have been problems involved in the construction, operation, use, servicing and repair of television banking equipment, related to the rapid pneumatic tube movement of a carrier between terminal stations, related to the stopping of the carrier at the stations, related to locating and positioning a carrier at a predetermined place within a terminal compartment, related to the maintenance of air seals, related to complicated mechanism design of terminal components, related to inaccessibility of individual components for adjustment, repair or replacement, and related to malfunctioning incident to slight wear or slight changes in relationship between components affecting adjustments necessary to be maintained.

Prior constructions have utilized relatively complicated shock absorber mechanisms to stop movement of a rapidly moving carrier at either terminal with a minimum of shock or impact to the structures, mechanisms, components and television equipment located at such terminal. These shock absorber mechanisms have been short-lived and have required frequent servicing or replacement of parts subjected to shock damage from repeated operation.

Mechanisms used in prior constructions for locating a carrier whose movement has been stopped, in a predetermined position in a terminal compartment and for latching the carrier in such position have been subject to rapid wear, the carrier has been damaged by the latch mechanism, and jamming between the carrier and locating mechanism has occurred. These difficulties have impaired adjustments necessary to be maintained for proper operation of other terminal components, such as the mechanism for unlatching a carrier door when the carrier has been properly positioned within the terminal compartment.

Other difficulties encountered in use of prior constructions include inaccessibility of limit switches controlling the operation of a power driven door for the terminal access opening for adjustment of such switches when necessary, and the necessity of dismantling major portions of the equipment to replace worn sealing gaskets when such replacement has been required.

All of these difficulties have limited the reliability of proper functioning of the terminal apparatus, and have required more frequent servicing of the equipment than normally should be required.

In addition to these difficulties, servicing of prior constructions has been time-consuming and expensive because it has been necessary to substantially dismantle the terminal apparatus each time repair or replacement of a major component has been required, or each time even a minor adjustment of the mechanism has been required.

Accordingly, it is a general object of the present invention to provide a new terminal apparatus for pneumatic tube systems comprising simplified mechanisms with enhanced reliability and serviceability in operation and use.

Furthermore, it is an object of the present invention to provide a new terminal apparatus for pneumatic tube systems comprising components of simplified construction assembled and related in such manner that any component can be reached for adjustment, repair or replacement without extensive dismantling procedures.

Also, it is an object of the present invention to provide a new terminal apparatus for pneumatic tube systems having a simple shock absorber device for stopping carrier movement.

In addition, it is an object of the present invention to provide a new terminal apparatus for pneumatic tube systems with a carrier locating and latching mechanism for locating and latching a carrier in a predetermined position upon arrival at the terminal so as to avoid injury or damage to the equipment upon operation of other terminal mechanisms when a carrier is out of proper position.

Furthermore, it is an object of the present invention to provide a new terminal apparatus for pneumatic tube systems with power-operated door means for the terminal access opening whose operation is controlled by limit switches accessible for adjustment.

Also, it is an object of the present invention to provide a new terminal apparatus for pneumatic tube systems having all terminal mechanisms mounted on a movable wall forming one of the walls of the terminal pressure compartment, whereby the terminal mechanisms may be readily bodily moved from the terminal pressure compartment to expose all mechanisms for individual access to perform any adjustments or repairs upon or replacements of mechanism components.

Furthermore, it is an object of the present invention to provide a new terminal apparatus for pneumatic tube systems with effective and efficient and readily replaceable seals for relatively movable walls of the terminal pressure compartment and for the carrier access opening door means.

In addition, it is an object of the present invention to provide a new terminal apparatus for pneumatic tube systems with door means for the carrier access opening and with safety devices controlling the operation of the door means to prevent injury to any individual using the apparatus.

Finally, it is an object of the present invention to provide a new terminal apparatus for pneumatic tube systems which eliminates difficulties heretofore encountered in the art; eliminates complicated mechanisms and assembly, maintenance and repair problems heretofore involved; avoids damage to pneumatic tube system components; provides for replaceability and serviceability of the equipment; achieves the stated objects in a simple, effective and inexpensive manner; and solves problems and satisfies needs existing in the art.

These and other objects and advantages apparent to those skilled in the art from the following description and claims may be obtained, the stated results achieved, and the described difficulties overcome, by the apparatus, combinations, parts, elements, subcombinations, arrangements, constructions, relationship and mounting of components, and operational features which comprise the present invention, the nature of which are set forth in the following general statements, a preferred embodiment of which—illustrative of the best mode in which applicants have contemplated applying the principles—is set forth in the following description and shown in the drawings, and which are particularly and distinctly pointed out and set forth in the appended claims forming part hereof.

The nature of one aspect of the improved pneumatic tube system terminal apparatus may be stated in general terms as including a pneumatic tube system pressure compartment housing including housing members provided with an opening; door means for the housing opening hinged to the housing; the door means preferably including a mounting plate member forming a closure for a portion of the housing opening, and a platform member projecting from the plate inwardly of the compartment forming a closure for the remainder of the housing opening; sealing means in pressure engagement between edge portions of the mounting plate and platform and the perimeter of the housing opening when the door means is in closed position, said sealing means preferably including a channel engaged gasket on one of the members, and an edge of the other member in pressure engagement with the gasket; a tube terminal section mounted on the door means closed at one end and open at its other end with the open end projecting through the platform member; means forming a sealed point between the tube terminal section and platform member; carrier arrester means mounted within the tube terminal section at the closed end thereof; the mounting plate being provided with a carrier access opening; a door member movably mounted on the mounting plate for closing said access opening; sealing means mounted on the door member adapted for pressure engagement with the mounting plate member throughout the perimeter of said access opening when the door member is in closed position; said door member sealing means being replaceable through said access opening; mechanisms mounted on the mounting plate for moving the door member between open and closed positions, for locating and latching a carrier in a predetermined position opposite said access opening upon carrier arrival at the tube terminal section, for unlatching a carrier door when such carrier is so located, and for releasing a carrier from located and latched position; a pneumatic system pressure connection for said housing compartment; and the housing door means being movable on its hinge mounting to an open position whereby the mechanisms and tube terminal section mounted thereon may be bodily moved out of the pressure compartment to expose all mechanisms for individual access for adjustment, replacement or repair.

The nature of another aspect of the improved pneumatic tube system terminal apparatus may be stated in general terms as including a pneumatic tube system pressure compartment housing, a pneumatic tube terminal section mounted within the compartment, means for supporting a carrier in predetermined position within said tube terminal section upon arrival, the housing and tube terminal section being provided with access opening means, a door member movably mounted on the housing for closing said access opening means, the carrier being provided with latched door means adapted to be opened when said access opening means is open, carrier door latch actuating mechanism mounted in said housing, power mechanism in said housing operatively connected with the door member for moving the door member between open and closed positions with respect to said access opening means, and said power mechanism operating said latch actuating mechanism in coordination with opening movement of the door member.

The nature of still another aspect of the improved pneumatic tube system terminal apparatus may be stated in general terms as including a pneumatic tube system pressure compartment housing, a pneumatic tube terminal section mounted within the compartment, the housing and tube terminal section being provided with access opening means, carrier locating and latching mechanism in the housing adapted to locate and latch a carrier in a predetermined position opposite said access opening means upon arrival of the carrier at the tube terminal section, said carrier locating and latching mechanism including a main latch member pivotally mounted on the tube section having a shoulder, the main latch member being biased normally to project the shoulder into the tube section, said main latch member being adapted by contact with a carrier moving past the latch member in said tube section in one direction to retract said shoulder from within the tube section, said latch member automatically returning to normal position with the shoulder located within the tube section after the carrier has moved in said one direction past the latch member, said shoulder supporting and locating the carrier in predetermined position in said tube section upon movement of the carrier in the other direction after its movement in said one direction has been arrested; said main latch member having a secondary latch finger pivotally mounted thereon with the finger biased normally to a location spaced above the shoulder to latch a projection on a carrier against movement in either direction in the tube section when the carrier is supported, held and located on said shoulder; said latch finger being movable with the main latch member when the latter retracts the shoulder from within the tube section; said latch finger being movable independent of movement of the main latch member upon movement of carrier in said other direction in said tube section to permit a carrier to be supported and held on said shoulder; and said latch finger automatically moving to latching position after the carrier is located in predetermined position by said shoulder.

The nature of still another aspect of the improved pneumatic tube system terminal apparatus may be stated in general terms as including in a pneumatic tube system terminal housing construction provided with access opening means and door means for the access opening means, frame means projecting from said housing forming a safety compartment surrounding said access opening means, a safety frame located in and movable within the compartment adapted to be engaged and moved by any external object trapped between the safety frame and door means upon closing of the door means, power means for operating said door means; and safety switches controlling operation of said power means mounted within said safety compartment and engaged by said safety frame upon movement of the latter in any direction out of normal position.

By way of example, an embodiment of the improved pneumatic tube system terminal apparatus is illustrated in the accompanying drawings forming part hereof in which:

FIGURE 1 is a perspective view of one form of television banking equipment using the new pneumatic tube system terminal apparatus;

FIG. 2 is a side elevation looking in the direction of the arrows 2—2, FIG. 3, of the terminal apparatus mechanisms mounted within the pressure compartment of the equipment illustrated in FIG. 1 showing the door means for the access opening in closed position;

FIG. 3 is a top plan view of the mechanisms shown in FIG. 2 looking in the direction of the arrows 3—3, FIG. 2, with certain of the parts broken away;

FIG. 8 is a view on a smaller scale similar to FIG. 5 but illustrating portions of the terminal cabinet and pressure chamber, looking in the direction of the arrows 8—8, FIG. 1;

FIG. 9 is a fragmentary view similar to a portion of FIG. 3 but showing the carrier door unlatching actuator in position to unlatch the carrier door;

FIG. 10 is a fragmentary sectional view taken on the line 10—10, FIG. 5;

FIG. 11 is a fragmentary sectional view taken on the line 11—11, FIG. 5;

FIG. 14 is a fragmentary sectional view taken on the line 14—14, FIG. 3, illustrating the drive for power operation of the door means;

FIG. 15 is a view similar to a portion of FIG. 5 illustrating the carrier locating and latching mechanism in one position of operation as the carrier is arriving at the terminal;

FIG. 16 is a view similar to FIG. 15 but showing the carrier locating and latching mechanism in another position after carrier movement has been arrested and the carrier is dropping onto the locating and latching mechanism;

FIG. 17 is a view similar to FIGS. 15 and 16 but illustrating the carrier locating and latching mechanism in retracted position to permit the carrier to drop from a latched position in the terminal and start movement through a pneumatic tube to a terminal station at the other end of the tube;

FIG. 23 is an exploded perspective view of the access opening door, door seal, and seal escutcheon elements of the construction shown in FIG. 18;

FIG. 24 is a fragmentary sectional view taken on the line 24—24, FIG. 1;

FIG. 25 is a fragmentary plan sectional view through a portion of the pressure compartment of the terminal apparatus taken on the line 25—25, FIG. 1;

FIG. 26 is a fragmentary sectional view taken on the line 26—26, FIG. 25;

FIG. 27 is a fragmentary sectional view looking in the direction of the arrows 27—27, FIG. 25; and FIG. 28 is a fragmentary view looking in the direction of the arrows 28—28, FIG. 24.

Similar numerals refer to similar parts throughout the various figures of the drawings.

Figure 4:
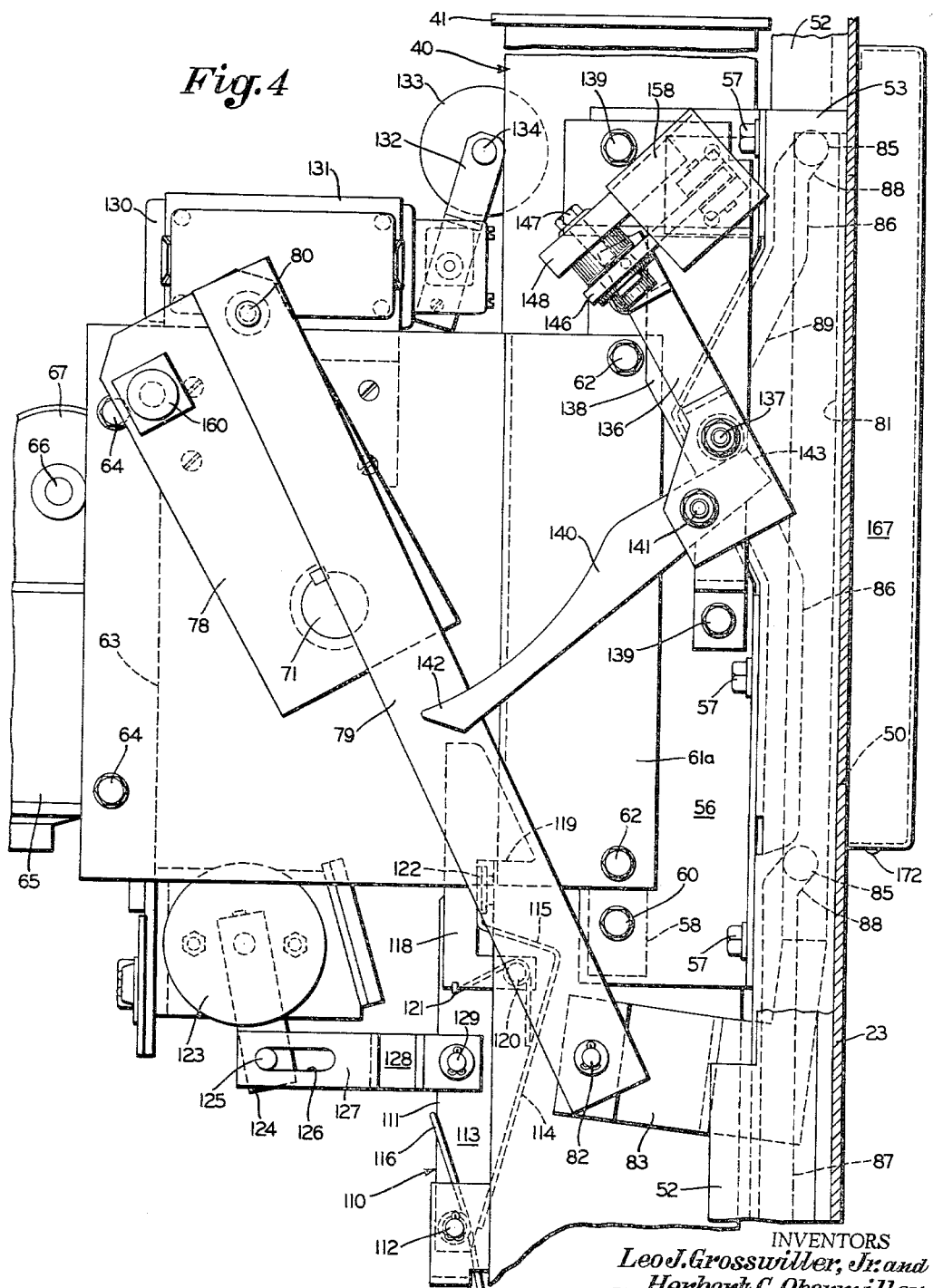
FIG. 4 is a side elevation similar to FIG. 2 but looking in the direction of the arrows 4—4, FIG. 3, the door means for the access opening being in closed position.

The improved pneumatic tube system terminal apparatus is illustrated generally at 1 in FIG. 1 and forms a part of the illustrated teller's console of banking service equipment in which a captive pneumatic tube carrier may convey banking transaction media back and forth between a kiosk and the teller's console. The customer's kiosk may include similar terminal apparatus. Other devices, such as a work table, may be provided for the teller. The invention is not limited to use of the improved terminal construction only at the console since essentially the same terminal construction may be used at the kiosk. Furthermore, the teller's console indicated at 1 preferably may form a part of television banking service equipment, such as shown in our co-pending applications Ser. No. 290,485 filed June 25, 1963 and 309,244 filed Sept. 16, 1963.

The console 1 may be located inside a bank and a similar kiosk may be located remote from the bank, adjacent a sidewalk, street or parking lot. Either may include a cabinet generally indicated at 2 provided with sound and television equipment for establishing and maintaining two-way oral and visual communication between the teller's console 1 and a similar kiosk, not shown. Thus, a television screen 3, a television camera 4, a sound speaker 5 and a microphone 6 may be housed in the cabinet 2 as well as lighting devices 7 and a door 8 for gaining access to electrical control devices, etc., also housed in cabinet 2.

Referring to FIGS. 1, 8 and 24 through 28, the pneumatic tube terminal apparatus includes a pressure compartment 25 formed by housing members mounted in the cabinet 1. The pressure compartment housing members preferably include a top wall 9 (FIG. 8), a back wall 10, a bottom wall 11, a right side wall 12 (FIG. 25) and a left side wall 13 mounted in any suitable manner as by structural members 14, 15, 16 and 17 (FIG. 25) carried by the cabinet 2.

The bottom wall 11 preferably terminates in an upturned flange 18 spaced from the front cabinet wall 19 (FIGS. 8 and 25). Thus, the pressure compartment 25 formed by housing members 9, 10, 11, 12, 13 and 18 is open opposite back wall 10 and to the right of bottom wall flange 18 (FIG. 8). This opening is closed by the door generally indicated at 20 hinged at 21 to cabinet cross member 22. The door 20 preferably includes a mounting plate member 23 and a platform member 24. The mounting plate member forms a closure for that portion of the opening of pressure compartment 25 which is opposite back wall 10; and platform member 24 forms a closure for that part of the opening of pressure compartment 25 which extends from bottom wall flange 18 to front cabinet wall 19. When the door 20 is closed as indicated in full lines in FIG. 8, the mounting plate member 23 thereof forms a continuation of the cabinet back wall members 8 and 19 as illustrated in FIGS. 1 and 8.

Door 20 may swing through 90° to an open position indicated at 26 in FIG. 8 illustrated by dot-dash lines. An intermediate swinging position of door 20 also is illustrated in FIG. 8.

The platform member 24 on door 20 projects from the mounting plate 23 inwardly of compartment 25 when door 20 is in closed position and when platform member 24 forms a closure for the bottom wall opening portion which is located to the right of bottom wall flange 18.

An airtight seal is provided between the door 20 and the housing members of pressure compartment 25 entirely around the perimeter of the housing opening closed by plate member 23 and platform member 24. This seal is preferably formed by pressure engagement betwen a gasket 27, preferably rubber, carried by one of the members and an edge of another member. As illustrated, the gasket 27 is held on the housing in a channel formed by a flange 28 spaced from bottom wall flange 18, and in channels formed by flanges 29 and 30 spaced respectively from sidewalls 12 and 13 (FIGS. 25 and 26) at and to the right of the front edge of bottom wall 11 (FIG. 8).

The gasket 27 also is held on the door 20 in a channel formed between the inturned vertical side edges 31 of plate member 23 and spaced angles 32 mounted on the inner face of plate member 23 at each side edge. Spaced angles 33 and 34 extend horizontally between the side edges of plate member 23 near the upper end thereof to form a channel also receiving gasket member 27.

The gasket member 27 is preferably formed as a continuous rubber member, round in cross section, and slightly compressed when inserted in the receiving channels described. The gasket is partially mounted on door 20 and partially on bottom wall 11 of the pressure compartment housing. Gasket 27 runs across the top of door 20 in the channel between angles 33 and 34 to the left-hand side edge (FIGS. 1, 8 and 25) then down the side edge 31 of door 20, then transfers to the channel formed between members 13 and 30 and along the plane of the housing bottom wall 11 back to bottom wall flange 18, then in the channel formed between members 18 and 28 along bottom wall 11 to right housing wall 12 (FIG. 25), then forward in the channel between members 12 and 29 in the plane of bottom wall 11, then transfers to the channel along the right vertical edge 31 of door 20 upward to the channel formed between angles 33 and 34. One of the transfer points between the mounting of the gasket 27 in channels on the housing members and channels on the door 20 is indicated at 35 in FIG. 25.

Gasket 27 when so mounted and when door 20 is closed is engaged by the bottom edge of flange 36 which runs around the back and sides of and projects downwardly from platform member 24, and by the outer edge 37 of housing member top wall 9 and the outer edges 38 and 39 of housing sidewalls 12 and 13, thus forming a sealed joint for the door 20 of pressure compartment 25 when the door is in closed position illustrated in full lines in FIG. 8.

A tube terminal section generally indicated at 40 for the pneumatic tube system is mounted on the door 20. The top end of tube 40 is closed by plate 41 and the lower open end 42 of tube 40 projects through platform member 24, a sealed joint being provided between the tube 40 and platform 24 preferably by a sealing plate 43 engaging a gasket 44 which surrounds the tube section 40.

The open end 42 of pneumatic tube terminal section 40 may be coupled by a releasable coupling 45 with a pneumatic tube 46 which runs from the console 1 to the other terminal of the pneumatic system. Pressure compartment 25 is provided with a pressure connection 47. Pressure connection 47 preferably communicates with the atmosphere where the improved terminal apparatus is located at the kiosk or customer station. Where the terminal apparatus is located at the teller's console, as illustrated, pressure connection 47 is connected with a supply of differential pressure, either pressure or vacuum, for conveying a carrier to and fro through the pneumatic tube 46 between the terminals.

The compartment of the terminal apparatus called a "pressure" compartment 25 herein is termed a pressure compartment since the pressure therein is either greater or less than that in the pneumatic tube 46 beyond a carrier being conveyed in tube 46 by relative differential pressure.

Figure 5:
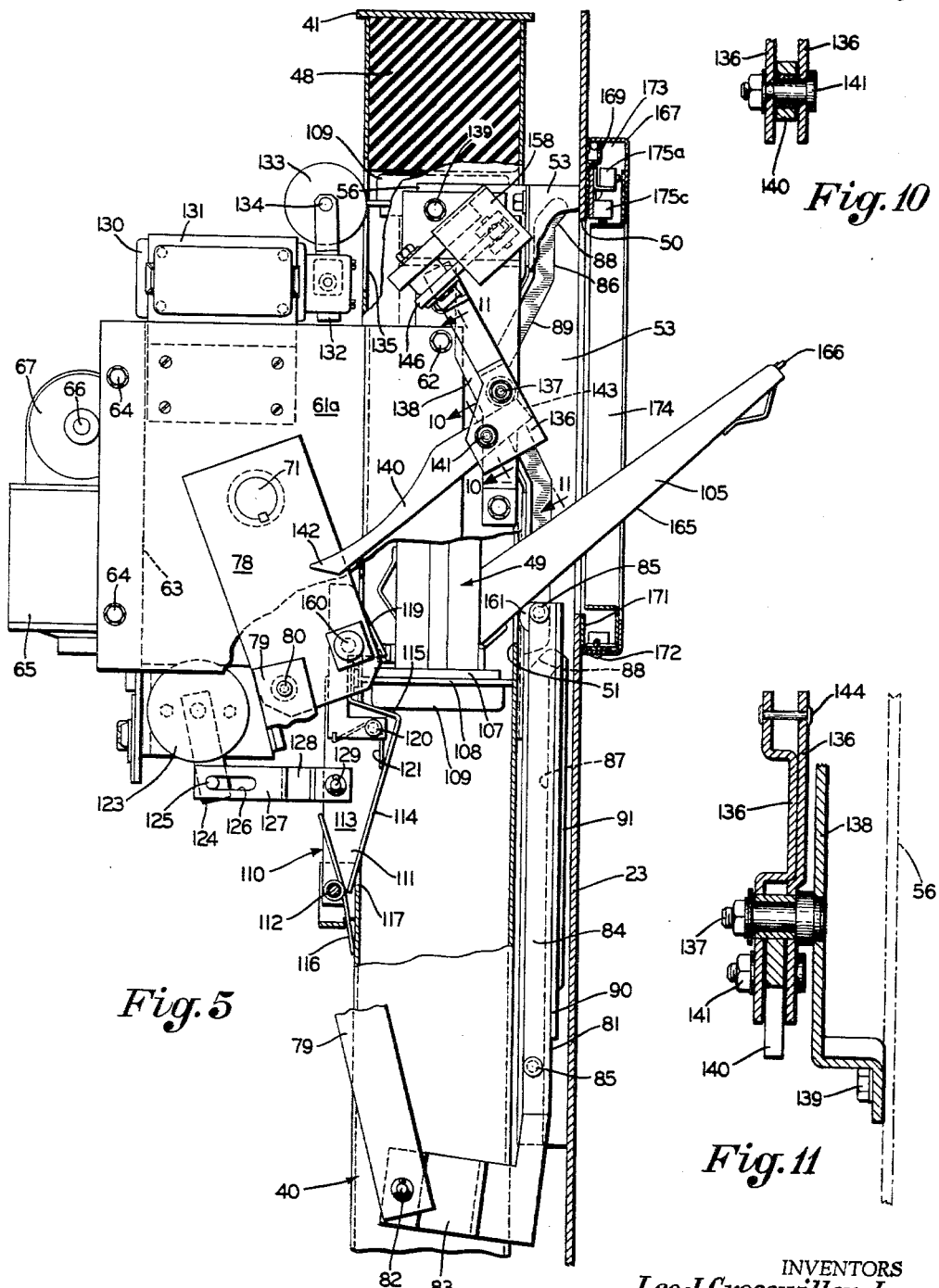
FIG. 5 is a view similar to FIG. 4 but showing certain parts broken away and in section and showing the door means for the access opening and carrier in open position.

Referring to FIG. 5, the upper end of tube terminal section 40 beneath end plate 41 is filled with preferably urethane foam 48 which acts as a shock absorber to stop the movement of a carrier generally indicated at 49 upon arrival at the terminal.

A carrier access opening 50 (FIGS. 2, 5 and 19) is formed in the plate member 23 and a similar opening 51 (FIG. 5) is formed in tube terminal section 40. A pair of angle members 52 (FIGS. 2, 3 and 8) are mounted on the rear face of plate member 23, extending vertically and spaced outwardly from the side edges of access opening 50. A pair of track members 53 spaced by reinforcing strip spacer members 54 are mounted on the facing surfaces of the inwardly projecting legs of angle members 52 by bolts 55.

A pair of curtain angles 56 are mounted by bolts 57 on and at the rear of track members 53 (FIG. 3). Vertically extending blocks 58 preferably welded at 59 to tube terminal section 40 (FIGS. 2, 3 and 9) are bolted at 60 to the rearwardly projecting legs of curtain angles 56 whereby the tube terminal section 40 is mounted on the pressure compartment door 20.

Offset bracket plates 61 and 61a also are mounted on the curtain angles 56 by bolts 62. The rear portions of offset bracket plates 61 and 61a are connected together by a vertically extending channel member 63, bolted at 64 to plates 61 and 61a. Thus, a rigid frame structure is formed by members 52, 53, 54, 56, 61, 61a and 63 projecting rearwardly from the inner face of mounting plate member 23 of pressure compartment door 20; and the tube terminal section 40 is removably mounted on this frame structure by the bolts 60.

A motor 65 for power operation of the terminal apparatus is mounted on channel member 63 for driving power shaft 66 which projects from gear box 67 connected to motor 65. A sprocket 68 is mounted on shaft 66 driving a chain 69 which in turn drives a sprocket wheel 70 (FIGS. 3 and 14). The sprocket wheel 70 is keyed to a main drive shaft 71 which is journalled in bearings 72 mounted on the offset bracket plates 61 and 61a. The drive shaft 71 extends laterally beyond and outside of each bracket plate 61 and 61a.

A cam member 73 having an arcuate lobe 74 (FIGS. 2 and 3) is mounted on main drive shaft 71 adjacent the right end (FIG. 3) thereof and adjacent and to the right of bracket plate 61. A drive lever 75 also is fixed to the right-hand end of shaft 71, and the upper end of drive lever 75 is pivotally connected at 76 to the upper end of door drive link 77. A drive plate 78 serving in part the same function as drive lever 75 is fixed to the left-hand end (FIG. 3) of main drive shaft 71, and another door drive link 79 similar to drive link 77 is pivoted at 80 to drive plate 78.

A door 81 is provided for the carrier access opening 50 in mounting plate member 23. Door 81 moves generally vertically when moving between open and closed positions, the closed position being illustrated in FIGS. 2, 3 and 4 and the open position being illustrated in FIG. 5. Door 81 is power operated by pivotal connections 82 between the lower ends of door drive links 77 and 79 and inturned ears 83 at the lower corners of door 81. Door 81 preferably has inturned flanges 84 at its vertical side edges (FIG. 3); and suspension or guide rollers 85 are mounted on flanges 84 near to the top and bottom corners of the door.

Track members 53 are each provided with upper cam or guide slots 86 and lower cam or guide slots 87 (FIG. 2) in which the door guide rollers 85 travel. The track guide slots 86 and 87 each extend generally vertically each terminating at its top end in an angled slot portion 88 directed upwardly toward plate member 23. The upper guide slots 86 also are provided with an intermediate V-slot section 89 directed upwardly first away from and then toward the access opening 50 (FIG. 5).

Thus, the lower end of door 81 in moving from the open position of FIG. 5 to the closed position of FIG. 2 guided by the two lower rollers 85 travelling in lower guide slots 87, travels vertically upward, and when approaching closed position moves toward plate member 23 by the control of angled slot portions 88 at the upper ends of lower guide slots 87. At the same time, the upper end of door 81 in moving from open to closed position controlled by upper guide rollers 85 moving in upper guide slots 86 moves vertically upward, then away from and then toward plate members 23, by the action of V-slot section 89, and finally moves further toward plate member 23 as closed position is reached, by the action of angled slot portions 88 at the upper ends of upper guide slots 86.

Substantially the entire outer face of door 81 is covered by a flexible sheet-like gasket member 90 (FIGS. 18, 19 and 23) held in position thereon by an escutcheon plate 91. Escutcheon plate 91 is assembled to door 81 by a plurality of pins 92 extending through openings 93 in the sheet gasket 90 and through bayonet slots 94 in door 81. Pins 92 have heads 95 engaging the rear face of door 81 behind slots 94. A single screw 96 (FIGS. 18 and 19) accessible from the exterior of cabinet 2 connects escutcheon plate 91 and door 81 through sheet gasket 90 and maintains the escutcheon plate 91 assembled in gasket-holding position.

The gasket construction for door 81 provides a sealing gasket means beyond and entirely around the edge of escutcheon plate 91 and covers the door surface that otherwise would be exposed. When door 81 reaches closed position (FIGS. 2 and 19), the sealing gasket 90 is compressed between door 81 and mounting plate 23 entirely around the carrier access opening 50 formed in mounting plate member 23 to thereby seal the pressure compartment 25.

In operation of the equipment, sheet gasket 90 is subjected to repeated compression and release upon closing and opening door 81 and, therefore, may need relatively frequent replacement. Such replacement can be accomplished readily from the exterior of the apparatus by merely unscrewing 96, sliding the pins 92 in bayonet slots 94 and removing the escutcheon plate with the door 81 in a position just starting to open. Thereupon, the sheet gasket 90 may be removed through the access opening 50 and replaced by a new sheet gasket accompanied by reassembly of escutcheon plate 91 and screw 96.

In this manner, gasket repair can be accomplished from the exterior of cabinet 2 without disturbing or tearing down any of the other elements of the terminal apparatus.

The door 81 is power operated and is moved between open and closed positions by oscillation of main drive shaft 71 from reversing movement of motor 65. Referring to FIG. 2, with door 81 closed, movement of motor 65 in one direction rotates shaft 71 counterclockwise to open the door until a rotated shaft position, such as illustrated in FIG. 5, has been reached. At this time the cam lobe 74 on shaft 71 will strike actuator 97 on limit switch 98 connected in the power supply for motor 65, stopping further movement of motor 65 and stopping further opening movement of door 81. Limit switch 98 thus may be termed the "door-open" limit switch.

Reverse operation of motor 65 when door 81 is open rotates shaft 71 clockwise to the position shown in full lines in FIG. 2 whereupon cam lobe 74 engages actuator 99 of "door-closed" limit switch 100 also connected in the power supply for motor 65 to stop motor 65 and to stop further closing movement of door 81. Thus, the same cam lobe 74 actuates both limit switches 98 and 100. Limit switches 98 and 100 are mounted on adjustable plates 101 and 102 which may be clamped in any adjusted position by bolts 103 extending through arcuate slots 104 in switch mounting plates 101 and 102. Plates 101 and 102 are pivoted about shaft 71 adjacent offset bracket plate 61 (FIG. 3) to which plates 101 and 102 are clamped when adjusting screws 103 are tightened.

A captive pneumatic tube system carrier 49 which moves back and forth in pneumatic tube 46 by differential pressure is illustrated at various locations with respect to the terminal apparatus particularly in FIGS. 3, 5, 9, 15, 16 and 17. The carrier illustrated may be the type shown in the co-pending Grosswiller and Duncan application Ser. No. 297,751, and includes carrier doors, one being illustrated at 105 in FIG. 5, and latch mechanisms for the carrier doors, one latch mechanism 106 being illustrated in FIG. 9. Carrier 49 has an end plate 107, an accelerating disc 108 and a cushion member 109 which form an oval flange-like projection at each end of the carrier, as shown.

A carrier 49 travelling through pneumatic tube 46 and arriving at tube terminal section 40 of console 1 is illustrated in FIG. 15 travelling upwardly at considerable speed. Upward movement is stopped (FIG. 5) by carrier cushion 109 striking foam stop member 48 at the upper end of tube terminal section 40 accompanied by considerable compression of foam stop member 48. Upon arrival of carrier 49 at the tube terminal section 40, it is desired to latch and locate the carrier at a predetermined position with respect to carrier access opening 50. This is accomplished by a locating and latch mechanism generally indicated at 110.

The locating and latch mechanism 110 preferably includes a main latch member 111 pivotally mounted at 112 at the rear of tube terminal section 40. Member 111 preferably is T-shaped in cross section having a vertical stem portion 113 and a cross portion 114 formed to provide a shoulder 115 adjacent the upper end of member 111. Member 111 is biased by spring 116 normally to project cross portion 114 and shoulder 115 through opening 117 in tube terminal section 40 to locate shoulder 115 within the passage in tube terminal section 40.

A secondary hook-shaped latch finger 118 having a hook stop 119 is pivotally mounted at 120 on main latch member 111 and is normally biased by spring 121 in a clockwise direction (FIGS. 5 and 15) toward abutment 122 on main latch member 111.

The normal positional relationship between main latch member 111 and secondary latch finger 118 is shown in full lines in FIGS. 5 and 17 wherein the hook stop 119 is spaced above shoulder 115.

Assume that latch mechanism 110 is in normal position as shown in full lines in FIG. 5 and in dot-dash lines in FIG. 15, but that the carrier illustrated is not present. Now, referring to FIG. 15, assume that a rapidly travelling carrier 49 is arriving at the terminal as indicated by the arrow. When the carrier 49 reaches the position shown by dot-dash lines, the upper flange-like projection thereof engages latch mechanism 110 which at this time also is in the dot-dash line position shown. As the carrier continues to move upward to the full line position shown, the flange-like projection of carrier flange 107, accelerator disc 108 and cushion 109 slide along cross portion 114 of main latch member 111 moving the latter out of the tube chamber to the position shown in full lines (FIG. 15).

Carrier 49 continues to move upward in tube section 40 until it is stopped by striking foam shock absorber stop 48. At this time the lower flange-like projection formed by members 107, 108 and 109 at the lower end of carrier 49 has passed above the latch mechanism 110 to a position somewhat as shown in FIG. 16. After upward carrier movement has been stopped by the shock absorber, the carrier drops under the influence of gravity as indicated by the arrow in FIG. 16, pivoting secondary latch finger 118 from the dot-dash line position to the full line position shown. Carrier 49 continues to drop until it rests on the main latch member shoulder 115 as illustrated in full lines in FIG. 5. This locates carrier 49 in the proper predetermined position with respect to the access opening 50 in mounting plate member 23. Meanwhile, secondary latch finger 118 springs back to normal position, illustrated in FIG. 5, with the hook stop 119 located above the flange-like projection formed by members 107, 108 and 109 at the lower end of the carrier. Hook stop 119 thus latches the carrier against any appreciable upward movement out of the predetermined located position illustrated in FIG. 5 and in dot-dash lines in FIG. 17.

In the operation sequence described, carrier 49, moving upward past latch mechanism 10, retracts shoulder 115 from within the tube section; and latch mechanism 110 automatically returns to normal position with shoulder 115 located within tube section 40 after carrier 49 has moved past the latch mechanism.

A rotary solenoid 123 is mounted in a suitable manner at the lower end of channel member 63 having a radial arm 124 provided with pins 125 received in elongated slots 126 formed in bifurcated portions 127 of a draw bar 128 which is pivotally connected at 129 to main latch member 111. The radial arm 124 of rotary solenoid 123 normally is in the position shown in full lines in FIGS. 2, 5, 15 and 16. In this position, the slotted connection between pins 125 and slots 126 permit the latch mechanism 110 to be located in normal position as shown in dot-dash lines in FIG. 15 and to be moved to retracted position as shown in full lines in FIG. 15.

The latch mechanism 110, as a whole, may be power operated to retracted position by energizing rotary solenoid 123 which moves radial arm 124 to the position shown in FIG. 17 wherein the shoulder 115 is withdrawn or retracted from the chamber in tube section 40. Such latch retraction operation is initiated when it is desired to release the carrier for movement through the pneumatic tube as shown by the arrow in FIG. 17. Retraction of shoulder 115 permits the carrier 49 to drop from the predetermined position illustrated in dot-dash lines to a position such as shown in full lines wherein differential pressure in the pneumatic tube will convey carrier 49 from the one terminal illustrated to another terminal at the other end of the pneumatic tube system.

A rotary switch housing 130 is mounted on a Z-shaped bracket 131 carried by offset bracket plate 61a (FIGS. 2, 3 and 4). The rotary switch is provided with a radial arm actuator lever 132 on the outer end of which a roller 133 is journalled at 134. Arm 132 normally is biased to the position shown in FIG. 2 with the roller 133 projecting into tube terminal section 40 through an opening 135 formed in tube section 40.

When a carrier 49 arrives at the terminal 1 and is located in the predetermined position with respect to access opening 50 in mounting plate 23 (FIG. 5) the projecting flange at the upper end of the carrier formed by members 107, 108 and 109 engages roller 133 and moves the roller and arm 132 to the position shown in FIG. 5 and holds the roller and arm in such position. The rotary switch 130 is connected in the circuit to a blower (not shown) which supplies differential pressure to the pneumatic system, so that when the switch is tripped by roller 133 in the position shown in FIG. 5, the blower is stopped. So long as the carrier 49 remains at the position shown in FIG. 5, the rotary switch in housing 130 remains tripped and the blower remains stopped.

Power operation of door 81 between open and closed positions by oscillation of main drive shaft 71 from reversing movement of motor 65 coincidentally or simultaneously power operates the control of another mechanism for carrier door 105.

A bell crank lever 136 is pivotally mounted at 137 on a bracket 138, bolted at 139 to curtain angle 56 at the left (FIG. 3) of tube terminal section 40. A curved finger 140 is pivoted intermediate its ends at 141 to the lower end of bell crank 136. The curved finger 140 has a cam engaging outer end 142 and a stop end 143 (FIG. 4), the stop end 143 engaging pivot 137 to limit counterclockwise movement of finger 140 on its pivot 141. The position of bell crank lever 136 and finger 140, when door 81 is in closed position, is illustrated in FIGS. 4 and 8.

The upper end of bell crank lever 136 is connected at 144 by a chain 145 (FIGS. 6, 7, 12 and 13) with another bell crank lever 146 pivotally mounted at 147 on a bracket 148 also mounted on bracket 138. The other end of bell crank lever 146 is pivotally connected at 149 to a compound plunger 150 having a cylindrical tubular portion 151 and a plunger rod 152 projecting through curtain angle 56 and terminating in adjustable head 153.

Compound plunger 150 is normally urged away from tube terminal section 40 (FIGS. 3 and 13) by spring 154 reacting between curtain angle 56 and the end of cylinder 151. Rod 152 is maintained assembled within cylinder 151 of compound plunger 150 by a pin and slot connection 155; and spring 156 normally urges rod 152 outwardly of cylinder 151.

Figure 13:
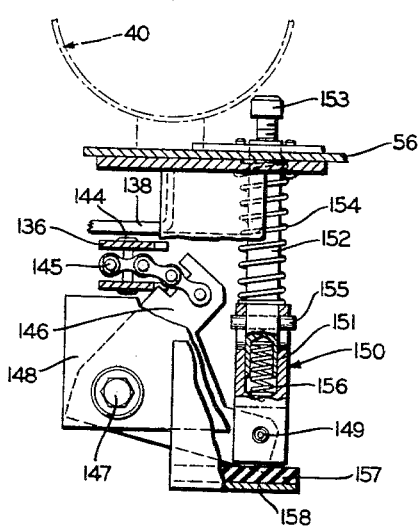
FIG. 13 is a view similar to FIG. 12 but showing the carrier door actuator mechanism in retracted position corresponding to the position of the parts in FIGS. 4 and 7.

Spring 154 in urging compound plunger 150 to the position shown in FIG. 13 also normally holds bell crank lever 146 in the position there shown. This in turn reacts through connecting chain 145 to normally hold bell crank lever 136 in the position shown in FIGS. 4, 5, and 8. Movement of compound plunger 150 by spring 154 is limited and stopped by rubber cushion 157 carried by angle bracket 158 mounted on bracket 148.

Figure 12:
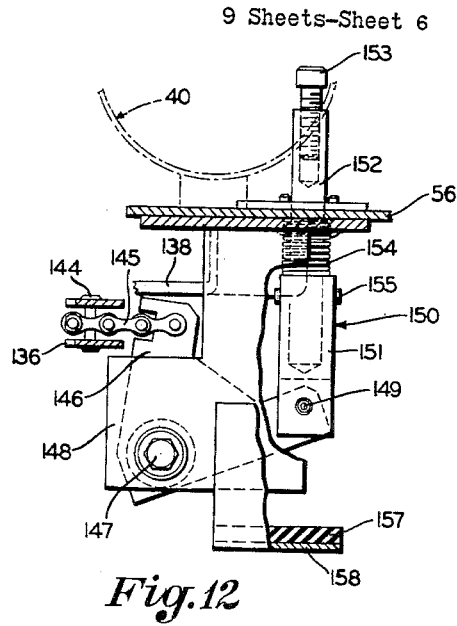
FIG. 12 is a fragmentary sectional view looking in the direction of the arrows 12—12, FIG. 6, with the carrier door actuator mechanism in actuating position corresponding to the position of the parts in FIGS. 6 and 9.

Compound plunger 150 may be moved from the position of FIG. 13 to that of FIGS. 9 and 12 by rotation of bell crank 146 counterclockwise (FIGS. 12 and 13) in a manner to be described. During such movement, plunger rod 152 and its adjustable head 153 are projected through an opening 159 formed in tube terminal section 40 (FIGS. 3, 9, 12 and 13); and adjustable head 153 engages the door latch mechanism 106 (FIG. 9) of a carrier 49 located in a predetermined position. In this manner, the door latch mechanism 106 is unlatched permitting the carrier door 105 to open.

The operation of compound plunger 150 and its head 153 for unlatching carrier door when a carrier is properly located is coordinated with the power operation of door 81, so that carrier door 105 will not be unlatched until door 81 has moved toward fully opened position a sufficient distance that carrier door 105 can swing through access opening 50.

Assume that both doors 81 and 105 are closed and that a carrier 49 is located and held latched by shoulder 115 in a predetermined position opposite access opening 50 (FIGS. 3, 4 and 8). Assume further that motor 65 is being operated in a direction to open door 81 which drives shaft 71 clockwise, viewing FIGS. 4 and 6, or counterclockwise, viewing FIG. 2. As shaft 71 approaches its limit of clockwise rotation (FIG. 6), a cam roller 160 carried by drive plate 78 engages the cam end 142 of curved finger 140. This moves finger 140 from the position shown in FIG. 4 to that shown in full lines in FIG. 6. Movement of finger 140 in this manner turns bell crank 136 counterclockwise (FIG. 6) which in turn moves bell crank 146 counterclockwise to the position shown in FIG. 12 projecting plunger head 153 to carrier door unlatching position, as shown in FIGS. 9 and 12.

Figure 6:
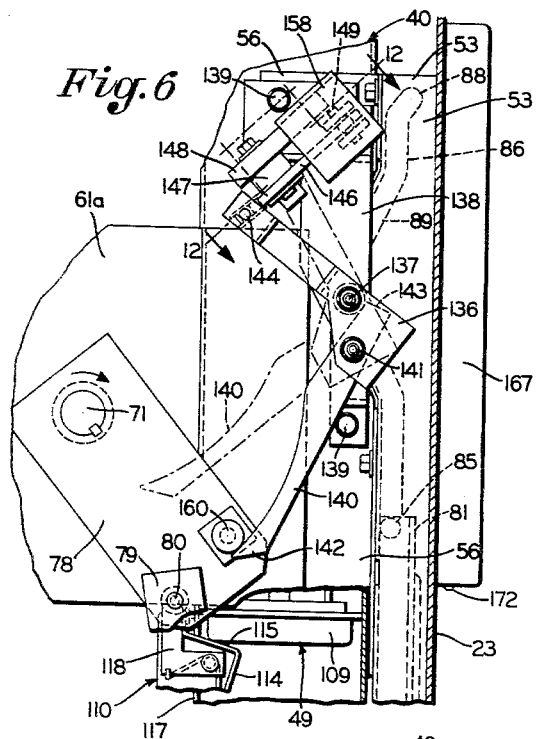
FIG. 6 is a fragmentary view similar to a portion of FIG. 5 illustrating certain of the parts in a position assumed during movement of the door means from closed to open position.
Figure 7:
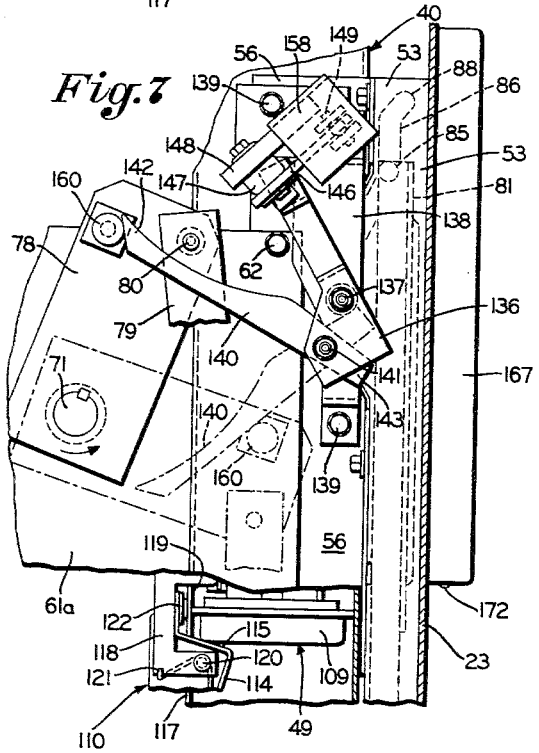
FIG. 7 is a view similar to FIG. 6 but showing the parts in a position assumed during movement of the door means from open to closed positions.

As shaft 71 continues to turn clockwise to its limit of movement controlled by "door-open" limit switch 98, drive plate 78 finally reaches the position shown in FIG. 5 and cam roller 160 releases cam end 142 of finger 140, permitting finger 140, bell crank 136, bell crank 146 and compound plunger 150 to move back to the position shown in FIGS. 5 and 13 and in dot-dash lines in FIGS. 6 and 7.

In this manner, the mechanism for unlatching the carrier door 105 is power operated in coordination with the opening of the terminal access door 81. This carrier door unlatching mechanism, however, does not function during power operation of door 81 from open to closed position. When shaft 71 moves counterclockwise as indicated by the arrow in FIG. 7, to impart closing movement to door 81, drive plate 78 reaches a position such as shown in dot-dash lines in FIG. 7 wherein cam roller 160 engages the underside of finger 140. Finger 140, however, can pivot clockwise around its pivot 141 without moving bell crank 136. Such clockwise movement of finger 140 continues until drive plate 78 reaches a position such as shown in full lines in FIG. 7, at which time cam roller 160 is ready to release cam end 142 of finger 140. After such release occurs, finger 140 drops by gravity to the dot-dash position shown in FIG. 7.

The head of plunger rod 152 is adjustable, so that the proper relationship can be established between the head 153 and the door latch mechanism 106 (FIG. 9) during unlatching. Once the adjustment is made, further adjustment normally is unnecessary.

A carrier door engaging roll 161 carried by shaft 162, spring-pressed at 163 (FIG. 19), and mounted on bracket 164 is provided centrally at the upper inner face of door 81. Roll 161 is adapted to engage and roll upon the outer surface 165 of carrier door 105 (FIG. 5) when door 81 moves from open to closed position. As the upper end of door 81 moves to the left (FIG. 5) by movement of rollers 85 in V-slot section 89 of track member 53, roll 161 presses carrier door 105 sufficiently toward closed position that the carrier latch mechanism 106 will engage catch 166 (FIGS. 5 and 9) at the upper end of door 105. Carrier door latch mechanism 106 is spring-biased to move to the left (FIG. 9) when compound plunger 150 moves out of unlatching position, as shown in said application Ser. No. 297,751.

Doors 81 and 105 and carrier access opening 50 in plate member 23 may be provided with door safety mechanism which generally functions, and is controlled and controls door operation as set forth in our co-pending application Ser. No. 309,244. However, the mounting and arrangement of the door safety construction preferably is simplified as illustrated particularly in FIGS. 5, 18 and 19.

A rectangular frame 167 preferably angular in cross section is mounted on the exterior face of plate member 23 surrounding access opening 50. Member 167 is assembled to plate member 23 by a downturned flange and reinforcing rod 168 at the upper edge of frame member 167 engaged over flange clip 169 mounted on plate member 23. The lower rail 170 of frame 167 (FIGS. 18 and 19) preferably is connected to angle bracket 171 mounted on plate member 23 by screws 172. Thus, frame member 167 may be removed readily from plate member 23 by removing screws 172 and then swinging the lower end of frame 167 away from plate member 23 and then lifting the frame upwardly.

Figure 18:
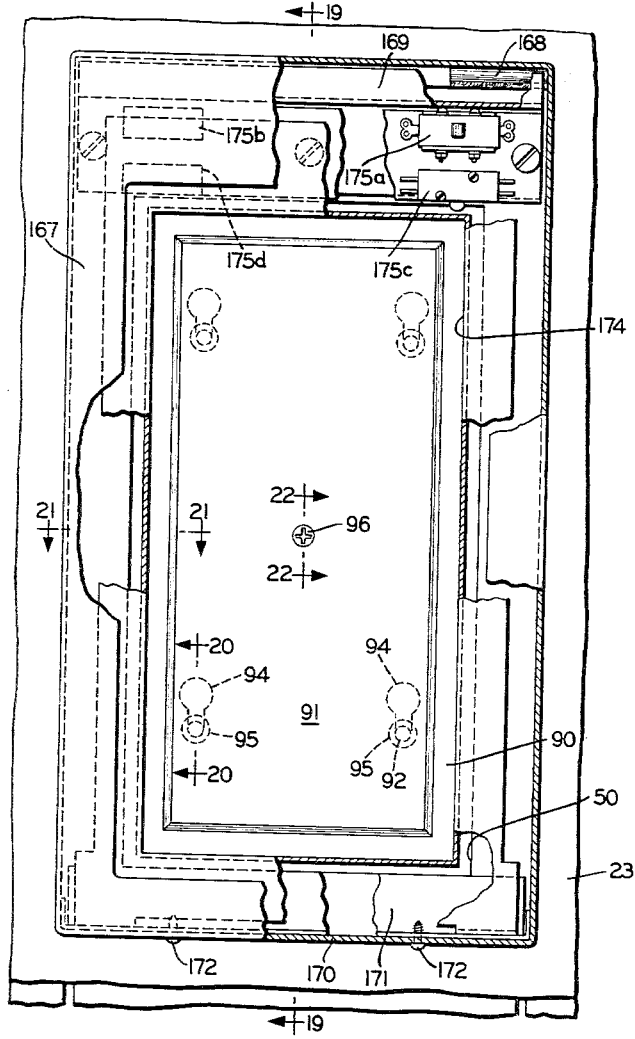
FIG. 18 is a fragmentary front elevation with parts broken away and in section of the access opening and door safety mechanism for the terminal apparatus.
Figure 19:
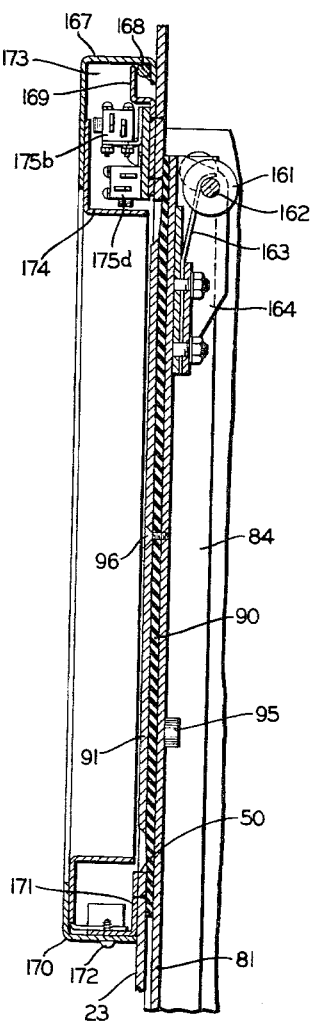
FIG. 19 is a vertical section taken on the line 19—19, FIG. 18.
Figures 20, 21:
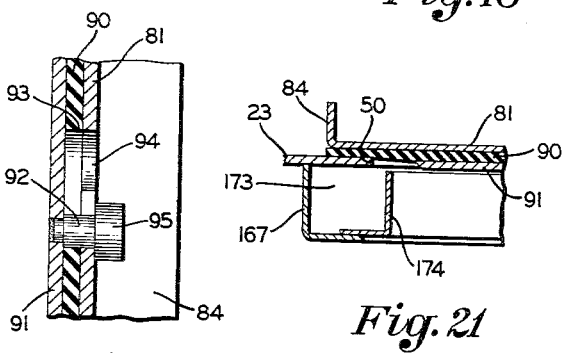
FIG. 20 is a section taken on the line 20—20, FIG. 18.
FIG. 21 is a fragmentary section taken on the line 21—21, FIG. 18.
Figure 22:
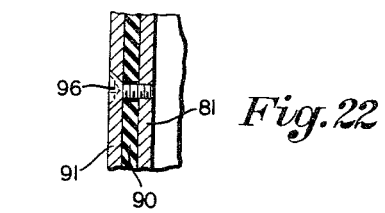
FIG. 22 is a fragmentary section taken on the line 22—22, FIG. 18.

When frame 167 is assembled as shown in FIGS. 18 and 19, it forms a rectangular safety compartment 173, box-like in shape.

A movable frame member 174, generally angular in cross section (FIGS. 18, 19, 20 and 21) is located in safety compartment 173, and is movable therein either up or down, or laterally, or inward toward plate member 23. Movable frame member 174 constitutes a safety frame which is adapted to be engaged and moved by any external object trapped between frame 174 and either of the doors 81 or 105 upon closing of the doors. Movement of safety frame 174 out of the normal position shown in FIG. 19 results in some portion of the frame engaging one of safety switches 175a, 175b, 175c and 175d also located within safety compartment 173. The safety switches are connected with the door control mechanism preferably as described in detail in said application Ser. No. 309,244, so that tripping of any one of the switches stops closing movement of the door and power operates the door to open position so long as a foreign object is trapped between any one of the doors and safety frame 174.

Phases of the operation of the improved pneumatic system terminal apparatus have been described and now will be summarized. A carrier 49 may be assumed to be pneumatically conveyed through pneumatic tube 46 and arrives at cabinet 2 at one or the other end or terminal of tube 46. The mechanisms in the pressure compartment 25 are in the positions shown in FIGS. 2, 4 and 8.

Carrier movement is stopped by foam shock absorber 48 when carrier 49 arrives at cabinet 2, and carrier 49 then drops to the position shown in FIGS. 5, 6 and 7 and in dot-dash lines in FIG. 17. It is located and latched in this predetermined position opposite access opening 50 by latch mechanism 110, doors 81 and 105 being closed. Carrier 49, located and latched in the position shown in FIG. 5, actuates rotary switch 130 through actuator arm 132 and roller 133, preferably to stop the blower for the pneumatic system. Carrier 49 thus is located at the terminal ready for immediate use when its use is desired.

For example, where the apparatus comprises a customer kiosk, carrier 49 will be located within pressure compartment 25 adjacent door 81. A bank teller, upon identifying a customer requesting service at the kiosk, may press a button which controls operation of motor 65 to energize motor 65 for opeing movement of door 81. Door 81 then will move to open position in the manner described. Coincidentally, by the same door opening power operation of shaft 71, the carrier door latch 106 is unlatched so that as door 81 reaches fully open position as shown in FIG. 5, carrier door 105 swings to the open position there shown.

When the immediate transaction has been completed, the bank teller then may press a control button to operate motor 65 in a direction to simultaneously close doors 81 and 105. After doors 81 and 105 have been closed, rotary solenoid 123 may be energized to release carrier 49 when desired for return movement to the other terminal. When the carrier is released by actuation of solenoid 123, as indicated in FIG. 17, the upper end of the carrier releases roller 133 so that rotary switch 130 moves to another position to permit blower operation for pneumatic movement of the carrier through the pneumatic tube.

Adjustment or replacement of any of safety switches 175a to 175d may be accomplished easily merely by removing screws 172 and detaching rectangular frame 167 to expose the safety switches for any adjustment or replacement.

Similarly, gasket 90 for door 81 can be replaced readily when required simply by removal of escutcheon plate 91. This may be accomplished from the exterior of the cabinet 2 through access opening 50.

The various mechanisms which form part of the equipment, including door 81 and its mounting, the mechanism for power operation of door 81, the mechanism for locating and latching a carrier 49 at a predetermined position, the mechanism for unlatching a carrier door when a carrier is properly located, the mechanism for releasing a latched carrier, as well as tube terminal section 40, all are mounted on pressure compartment door 20 and are located within pressure compartment 25 when door 20 is closed.

When any of these mechanism requires attention, adjustment, or repair, or replacement of any component, front cabinet wall 19 may be opened and pneumatic tube coupling 45 (FIG. 8) uncoupled. At this time door 20 may be moved from closed position to the fully open position indicated at 26 in FIG. 8 whereupon all mechanisms are bodily moved out of pressure compartment 25 and are exposed for individual access. Furthermore, each mechanism thus exposed is readily accessible for individual attention without requiring major dismantling of the equipment to reach some particular component.

Similarly, the electrical components such as limit switches 98 and 100, safety switches 175a to 175d, rotary switch 130, rotary solenoid 123 and motor 65 are all accessible readily for adjustment.

When door 20 is open as shown in FIG. 8, gasket 27 is exposed throughout its extent for ready replacement when required.

The locating and latching of a carrier 49 at a predetermined position is very important for several reasons. First, unless properly located with respect to access opening 50, the door mechanisms either for carrier 49 or for access opening 50 may not operate properly, or jamming can occur resulting in damage to the equipment. Second, if carrier 49 is not located properly, the carrier door unlatching mechanism including movement of compound plunger 150 will not function properly.

The proper positioning and latching of a carrier is achived in accordance with the invention by latch mechanism 110 which has a simplified construction but does not wear rapidly to impair its carrier locating function, and does not damage the carrier in operation, since a carrier will slide along the latch surface 114 in the same manner that the carrier moves through the pneumatic tube without appreciable wear.

Likewise, the shock absorber cushion 48 may be replaced readily when required and is very simplified as compared with complicated prior mechanical constructions that have been used.

The various features and advantages of the improved constructiion all combine to lend reliability and serviceability to the apparatus.

Accordingly, the improvements of the present invention provide for stopping a carrier without damage to the carrier or equipment; provide for locating and latching a carrier in the pressure compartment of a pneumatic system terminal at a predetermined position; provide effective and readily accessible and replaceable seals for relatively movable walls of and for the carrier access opening in a wall of the terminal pressure compartment; provide a construction enabling various operating mechanisms in the terminal compartment to be moved bodily therefrom for ready individual access, adjustment or repair; provide simplified safety devices for the door means; achieve the combined advantageous objectives with reliability and serviceability; and eliminate the difficulties noted, achieve the objectives described, and solve problems that have existed in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example and the scope of the invention is not limited to the exact details illustrated or described, because these may be varied without departing from the fundamental principles of the invention.

Having now described the features, discoveries and principles of the invention, the construction, operation, assembly, adjustment, use and characteristics of a preferred form thereof, and the advantageous, new and useful results obtained thereby; the new and useful discoveries, principles, apparatus, combinations, parts, elements, subcombinations, arrangements, constructions, relationship and mounting of components, controls, and operational features, and mechanical equivalents obvious to those skilled in the art are set forth in the appended claims.

We claim:

1. In pneumatic tube system terminal apparatus, housing walls forming a pressure compartment, a tube terminal section mounted in the compartment, one of the housing walls and tube section being provided with access opening means, a door member movably mounted on said one housing wall for closing said access opening means, sealing means mounted on the door member adapted for pressure engagement with said one housing wall throughout the perimeter of the access opening means when the door member is in closed position, means for moving the door member toward said one housing wall to compress the sealing means against said housing wall as the door member moves to closed position, and means accessible through said access opening means clamping said sealing means to said door member, whereby said sealing means may be replaced through said access opening means upon releasing said clamping means.

2. The construction defined in claim 1 in which the door member has a face, in which the sealing means includes a sheet gasket engaging and covering said door face, and in which the clamping means includes an escutacheon plate releasably connected to the door member and engaging a central portion of the sheet gasket and clamping the sheet gasket to said door face with a portion of the sheet gasket exposed entirely around the edge of the escutcheon plate for pressure engagement with the housing wall throughout the perimeter of the access opening means.

3. The construction defined in claim 2 in which the movable mounting of the door member on said one housing wall includes cam track means on the wall and roller guides on the door travelling in said cam track means, in which the cam track means extend generally parallel with said wall for moving the door member parallel with said wall throughout the major portion of door movement between open and closed positions, and in which the cam track means has angled portions directing the roller guides toward the housing wall to direct final door closing movement toward said housing wall to compress the sealing means against the housing wall.

4. In pneumatic tube system terminal apparatus, housing walls forming a pressure compartment, a tube terminal section mounted in the compartment, one of the housing walls and tube section being provided with access opening means, track members mounted on said one housing wall at either side of said access opening means, a door member for said access opening means having roller guides travelling in said track members for door movement between open and closed positions with respect to said access opening means, a pair of spaced curtain angles detachably mounted on said track members, said tube terminal section being detachably bolted to said curtain angles between the curtain angles to provide the mounting of the tube terminal section in the compartment, a pair of offset bracket plates detachably mounted on said curtain angles, a drive shaft journaled in said bracket plates, a channel member detachably connecting said bracket plates, a drive motor mounted on said channel member, drive means connecting said drive motor and drive shaft, and link means connected with the ends of said drive shaft and with said door member whereby said door member may be moved between open and closed positions by said motor.

5. In pneumatic tube system terminal apparatus, housing walls forming a pressure compartment provided with an opening at the front and at a portion of the bottom of said compartment, an L-shaped door wall for said opening hinged to said housing walls; the L-shaped door wall including an upright mounting plate closing the compartment front opening portion and a lateral platform member closing the compartment bottom opening portion; a tube terminal section mounted on the door wall within the compartment closed at one end and open at its other end; the open end of the tube section extending through the platform member to the exterior of the compartment; means forming a sealed joint between the tube terminal section and platform member where the tube section extends through the platform member; sealing means in pressure engagement between the door wall and housing walls; a pneumatic system tube; and detachable coupling means located externally of said compartment between the tube terminal section and said pneumatic tube.

6. Pneumatic tube system terminal apparatus including a pressure compartment housing, the housing including a movable housing door, a tube terminal section mounted on the housing door in the compartment, a carrier movable in said tube section, the housing and tube section being provided with access opening means, an access door movably mounted on the housing for closing said access opening means; mechanisms mounted on the housing door in the compartment for moving the access door between open and closed positions, for locating and latching the carrier in predetermined position with respect to the access opening means within said tube section upon carrier arrival at said tube section, for unlatching a carrier door when a carrier is thus located in predetermined position; and for releasing a carrier from located and latched position; and the housing door being movable to an open position whereby the mechanisms and tube terminal section mounted thereon and located in said compartment may be moved bodily out of the pressure compartment to expose all mechanisms for individual access.

7. Pneumatic tube system terminal apparatus including housing walls forming a pressure compartment provided with an opening at the front and at a portion of the bottom of said compartment; an L-shaped door wall for said opening hinged to said housing walls including an upright mounting plate closing the compartment front opening portion, and a lateral platform member closing the compartment bottom opening portion; sealing means between the L-shaped door wall and the perimeter of the compartment opening when the door wall is in closed position, said sealing means including channel formations on the housing walls and mounting plate extending around the perimeter of the opening, a gasket extending continuously around the perimeter of the opening engaged in said channel formations; and edge portions of said housing walls and said platform member being in pressure engagement with the gasket when the L-shaped door is in closed position; a tube terminal section mounted on the door wall within the compartment closed at one end and open at its other end; the open end of the tube section extending through the platform member to the exterior of the compartment; means forming a sealed joint between the tube terminal section and platform member where the tube section extends through the platform member; a pneumatic system tube; detachable coupling means located externally of said compartment between the tube terminal section and said pneumatic tube; the mounting plate and tube section being provided with access opening means, a door member movably mounted on said mounting plate for closing said access opening means, said door member having a face adjacent said mounting plate, sealing means for the door member including a sheet gasket engaging and covering said door face, an escutcheon plate releasably connected to the door member engaging a central portion of the sheet gasket and clamping the sheet gasket to said door face with a portion of the sheet gasket exposed entirely around the edge of the escutcheon plate; and means for moving the door member toward the mounting plate to compress the exposed sheet gasket portion between the door member and mounting plate throughout the perimeter of the access opening means as the door member moves to closed position.

8. Pneumatic tube system terminal apparatus including a pressure compartment housing, a tube terminal section mounted in the compartment, the housing and tube section being provided with access opening means, a carrier movable in said tube section, means for supporting the carrier in predetermined position with respect to the access opening means within said tube section upon carrier arrival at said tube section, a door member mounted on the housing for said tube section, a door member mounted on the housing for said access opening means movable between open and closed positions, power mechanism operatively connected with the door member for moving the door member between open and closed positions, the carrier being provided with latched door means adapted to be unlatched when said access opening means door member is open; carrier door latch actuating mechanism including a plunger adapted to be projected into the tube section to unlatch the carrier door means when a carrier is supported in predetermined position; and means including a finger operatively connected with the plunger, and a cam operatively connected with said power mechanism engageable in one direction of cam movement with said finger to move the finger for projecting said plunger to carrier door unlatching position upon movement of the power mechanism to open the door.

9. In pneumatic tube system terminal apparatus, housing walls forming a pressure compartment, a tube terminal section mounted in the compartment, one of the housing walls and tube section being provided with access opening means, track members mounted on said one housing wall at either side of said access opening means, a door member for said access opening means having roller guides travelling in said track members for door movement between open and closed positions with respect to said access opening means, spaced bracket means detachably connected with said track members, power means including a drive motor and drive shaft mounted on said bracket means, link means connected with the ends of said drive shaft and with said door member whereby said door member may be moved between open and closed positions by said drive motor, a pair of limit switches adjustably mounted on the bracket means and controlling operation of the drive motor for stopping the motor when the door reaches each of open and closed positions, and a single cam lobe on said drive shaft engageable respectively with said limit switches during door opening and closing movement of said drive motor.

10. Pneumatic tube system terminal apparatus including a pressure compartment housing, a tube terminal section mounted in the compartment closed at one end and open at its other end, carrier arrester means mounted within the tube section at the closed end thereof, the housing and tube section being provided with access opening means, a carrier movable in said tube section toward and away from said closed end, the carrier having a flange-like projection at each end, carrier locating and latching mechanism in the housing adapted to locate and latch a carrier in predetermined position with respect to the access opening means within the tube section upon carrier arrival at the tube section; the locating and latching mechanism including latch means having a shoulder and a latch finger spaced above the shoulder, the latch means being biased normally to project the shoulder end spaced finger into the tube section, said latch means being adapted by contact with a carrier moving past the latch means in the tube section in one direction toward the closed tube section end to retract said shoulder from within the tube section, said latch means automatically returning to normal position after the carrier has moved in said one direction past the latch means; said shoulder and finger straddling one carrier projection to support and latch a carrier against movement in either direction in the tube section and to locate such carrier in predetermined position with respect to said access opening means upon movement of the carrier in the tube section in a direction away from said closed tube section end after carrier movement in said one direction toward the closed tube section end has been arrested by said carrier arrester means; and means for retracting the latch means from within the tube section to release engagement of the latch means with the carrier projection to permit movement of the carrier out of the tube section.

11. The construction defined in claim 10 in which the latch means includes a main latch member pivotally mounted on the tube section having a shoulder, a secondary latch finger pivotally mounted on the main latch member with the finger biased normally to a location spaced above the shoulder, the latch finger moving with the main latch member when the latter is retracted from within the tube section, and the latch finger being movable relative to the main latch member independent of movement of the main latch member.

12. The construction defined in claim 10 including blower means supplying differential pressure to said tube section for pneumatic carrier movement in either direction in said tube section, and actuator operated switch means controlling operation of said blower means, the switch means having an actuator member engaged by a carrier located and latched in said predetermined position holding said switch means in blower-off position.

13. Pneumatic tube system terminal apparatus including a pressure compartment housing, a tube terminal section mounted in the compartment, the housing and tube section being provided with access opening means, a carrier movable in said tube section, means for supporting the carrier in predetermined position with respect to the access opening means within said tube section upon carrier arrival at the tube section, door means for the access opening means and carrier, frame means projecting from said housing forming a safety compartment surrounding said access opening means, a safety frame located in and movable within the safety compartment adapted to be engaged and moved by any external object trapped between the safety frame and door means upon closing of the door means, power means for operating said door means, and safety switch means controlling operation of said power means mounted wholly within said safety compartment and engaged by said safety frame upon movement of the latter in any direction out of normal position.

References Cited by the Examiner

UNITED STATES PATENTS

| | | | |
|---|---|---|---|
| 1,249,910 | 12/1917 | Deginder | 312—328 |
| 2,698,721 | 1/1955 | Van Otteren | 243—19 |
| 2,763,446 | 9/1956 | Hanson | 243—19 |
| 2,912,066 | 11/1959 | Ellithorpe | 243—34 |
| 3,053,475 | 9/1962 | Tonne | 243—20 |
| 3,080,136 | 3/1963 | Kelly | 243—34 |

SAMUEL F. COLEMAN, *Primary Examiner.*

ANDRES H. NIELSEN, *Examiner.*